United States Patent [19]

Pernum

[11] 4,440,253
[45] Apr. 3, 1984

[54] CRAWLER-TYPE TRANSPORT APPARATUS

[76] Inventor: Bertil Pernum, Bernstorpsvägen 18, S-232 00 Arlöv, Sweden

[21] Appl. No.: 351,035

[22] Filed: Feb. 22, 1982

[30] Foreign Application Priority Data

Jul. 6, 1981 [SE] Sweden ............................. 8104173

[51] Int. Cl.³ ............................................. B60V 3/04
[52] U.S. Cl. .................................. 180/116; 180/125; 280/28.5; 305/21
[58] Field of Search .................... 180/116, 125, 9.2 R; 280/28.5; 305/21, 22

[56] References Cited

U.S. PATENT DOCUMENTS

| 809,048 | 1/1906 | Furchtbar | 180/9.2 R |
| 3,168,929 | 2/1965 | Wardle | 305/22 |
| 3,261,418 | 7/1966 | Bertin | 180/116 |
| 3,950,038 | 4/1976 | Wood | 180/125 |

FOREIGN PATENT DOCUMENTS 215426 9/1967 Sweden .
400946 12/1973 Sweden .
2025869 1/1980 United Kingdom ............... 180/125

Primary Examiner—Joseph F. Peters, Jr.
Assistant Examiner—Kenneth R. Rice
Attorney, Agent, or Firm—Merchant, Gould, Smith, Edell, Welter & Schmidt

[57] ABSTRACT

The invention relates to a transport apparatus having at least one crawler vehicle with means for establishing a supporting air cushion between the chassis of the crawler vehicle and the upper side of the ground-engaging track part of the crawler vehicle, the invention being characterized in that the transport apparatus is provided with means cooperating with track-supporting wheels and adapted to hold down the tracks and to stretch the lower track part over the air cushion unit, and that the supporting wheels and the track are provided with cooperating engaging means adapted to prevent sideways travel of the tracks. In a preferred embodiment, the transport apparatus also has means for relieving at least part of the track pressure against the ground in connection with changes in the direction of travel.

1 Claim, 11 Drawing Figures

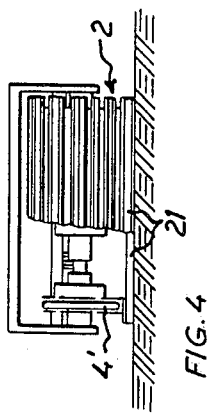
FIG.4
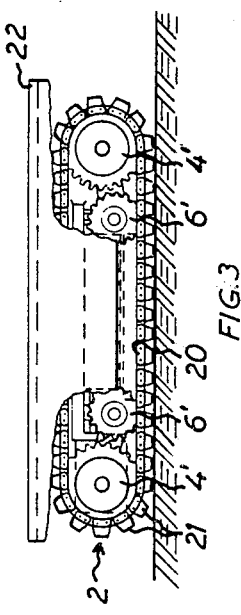
FIG.3
FIG.2
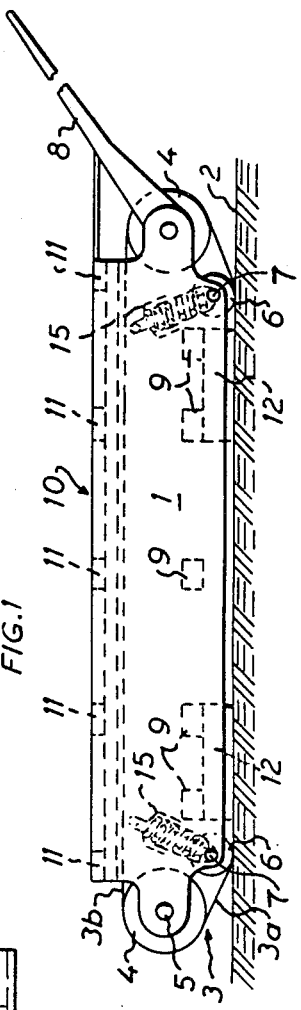
FIG.1

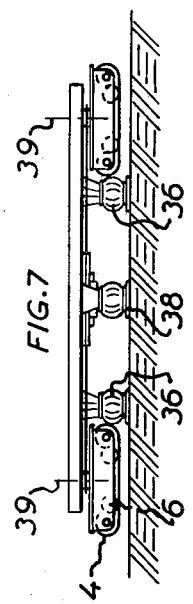
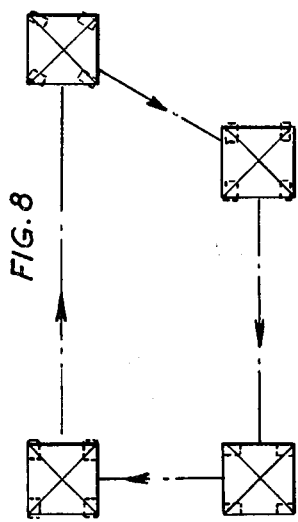
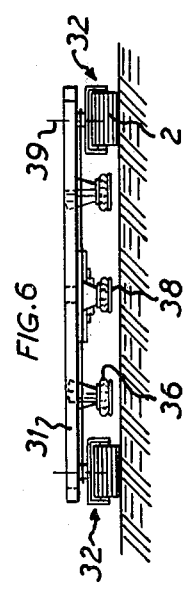
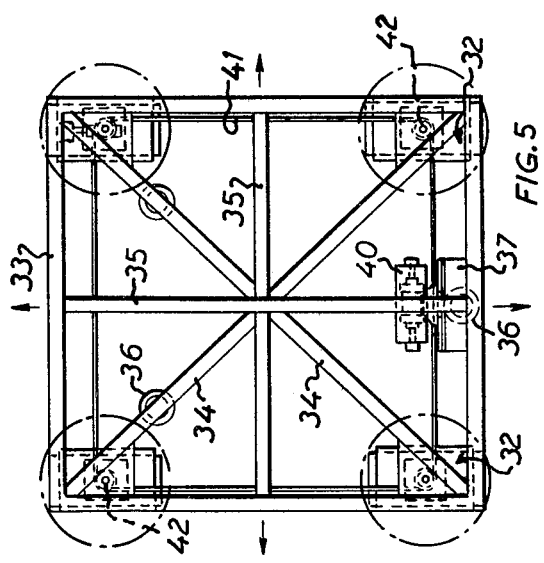

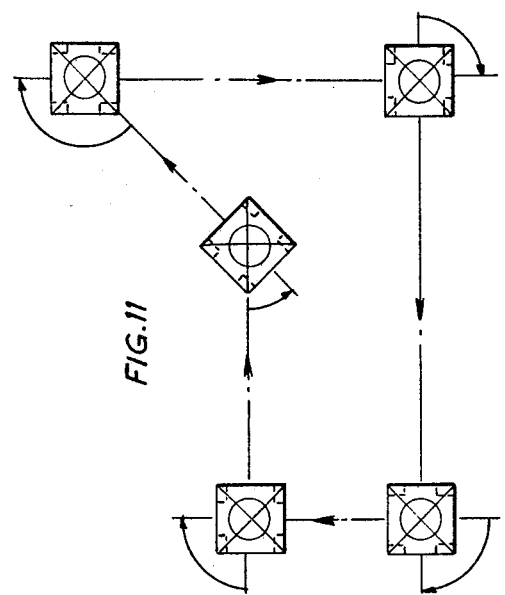
FIG.11
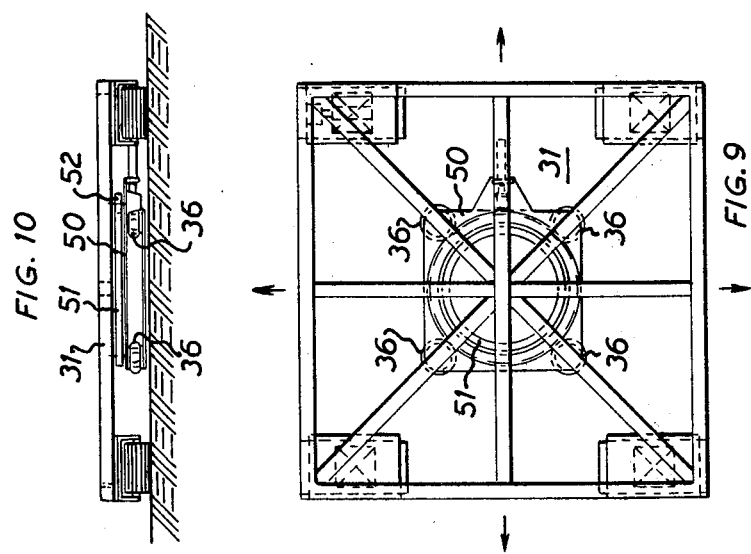
FIG.10
FIG.9

CRAWLER-TYPE TRANSPORT APPARATUS

The present invention relates to a crawler-type transport apparatus with a load-carrying air cushion device.

It is common practice in cargo handling to utilize the air cushion technique in order to facilitate both lifting and transport. The air cushion technique is utilized for instance for lifting heavy loads in factories and warehouses, so that only the forces of inertia must be surmounted to be able to move the load. It is also known to transport goods on conveyor belts supported by compressed air along the conveying distance.

In general, the use of air cushions is recommended for lifting heavy loads and reducing the necessary forces to be able to move the load, when the base (the floor) does not permit high point loads, for instance from wheels or rollers, when the load must be positioned exactly and gently and carefully handled, during transport in premises which are not explosion-proof, and when the load must be fixed when set down. However, as will appear from the following, the troublefree use of air cushions makes it necessary that the base (the floor) has a sufficiently smooth and even surface, and it is seldom possible to use an air cushion serviceable on the factory floor for moving goods in a storage yard outside the factory premises. Besides, considerable costs are involved in maintaining the factory floor in a condition providing for troublefree cargo transport on air cushions.

One way of surmounting these difficulties is to install air cushions in crawler-type vehicles, for instance as disclosed by Swedish patent specification No. 215,426 and Swedish published application No. 7308201-8 (Publication No. 400,946). A difficult problem encountered in vehicles of this type is that the tracks tend to sag between the guide wheels at the vehicle ends. Another difficulty resides in that the tracks tend to travel sideways on the guide wheels and support rollers. Admittedly, this tendency can be counteracted by lateral supports, but only at the cost of greater track wear and friction resistance. Another problem is the difficulty of steering the vehicle without putting undue strain upon the tracks, and it is especially difficult to effect any greater changes in the direction of travel.

If a loaded crawler-type transport vehicle is traveling over an inclined base, gravitational forces may cause the load to be displaced relative to the vehicle. In crawler-type transport vehicles where the load and the vehicle frame are supported to a higher or lesser degree by the track or tracks via an air film, the tracks will in such cases show an increased tendency to travel sideways and to be wedged against lateral supports, if such are provided, and the forces may then correspond to those which arise when the tracks must be turned relative to the base in order to change the direction of travel.

The present invention has for its object to provide an improved transport apparatus of the type described above and to elminate or to reduce the above-mentioned problems.

To realize this object, the present invention provides a transport apparatus comprising at least one crawler vehicle having a chasis, at least one movable endless track having a ground-engaging part, a plurality of wheels which are supported by the chassis and over which the track travels, said wheels comprising a track guide wheel at either end of the chassis, at least one air cushion-producing unit disposed between the chassis and the lower ground-engaging track part, and a source of compressed air for supplying air to the air cushion-producing unit in order to provide between the chassis and the ground-engaging track part an air film supporting the chassis relative to the ground via the ground-engaging track part, said transport apparatus being characterized in that, for supporting the ground-engaging track part in the area between the guide wheels at either end of the chassis and the adjacent air cushion unit, the chassis carries supporting wheels which are movable relative to the chassis and against which the ground-engaging track part is moving within said areas; that the track and the supporting wheels comprise engaging means cooperating with one another to retain the tracks against sideways travel on the wheels; and that the vehicle carries a device for biasing the movable supporting wheels in a direction for tensioning the tracks within the area where the track overlies the air cushion unit.

According to a preferred embodiment, the transport apparatus comprises a plurality of crawler vehicles each having one chassis, and a chassis which is common to and supported by said crawler vehicles. In order to facilitate changes in the direction of travel, the transport apparatus is provided at its underside and at a distance from said crawler vehicles with a device adapted to be urged against the ground for lifting the transport apparatus and said crawler vehicles or for relieving the load on said crawler vehicles, thereby to facilitate changes in the direction of travel of the transport apparatus.

The invention will be described in more detail in the following, reference being had to the embodiments illustrated in the drawings in which:

FIG. 1 is a schematic side view of the transport apparatus according to the invention, which apparatus comprises a crawler vehicle having an air cushion and a device for tensioning the track or tracks between the air cushion and the guide wheels at the ends of said track or tracks;

FIG. 2 is a plan view of a preferred embodiment of the invention with track driving chains, guide and driving chain wheels and track holding-down chain wheels;

FIG. 3 is a side view of the embodiment illustrated in FIG. 2;

FIG. 4 is an end view of the embodiment shown in FIGS. 2 and 3, the track being partly cut away to show a chain drive wheel;

FIG. 5 is a plan view of a transport apparatus according to the invention, consisting of a rectangular or square platform which is supported at its corners by four crawler vehicles of the type shown in FIGS. 1-3;

FIGS. 6 and 7 show the transport apparatus according to FIG. 5 in two different functional positions and seen from two sides at right angles relative to one another;

FIG. 8 illustrates a method of moving the transport apparatus according to FIGS. 5-7 and changing the direction of travel;

FIGS. 9 and 10 are respectively a plan view and a side view of a modification of the transport apparatus according FIGS. 2 and 3; and FIG. 11 illustrates a possibility of changing the direction of travel of the transport apparatus shown in FIGS. 9 and 10.

The transport apparatus as shown in FIG. 1 is in the form of a crawler vehicle and comprises a chassis which is generally designated 1 and in the embodiment illustrated has, for example, two endless tracks 3 for moving the apparatus on the ground 2. In the embodiment illustrated, the two tracks 3 extend along the two longitudinal sides of the vehicle over the entire length of said vehicle and can be spaced apart a given distance in the transverse direction of the vehicle. At the vehicle ends, the endless tracks 3 travel over wheels or rollers 4 which are mounted on axles 5 extending transversely of the vehicle and supported by the chassis 1. Furthermore, the lower parts 3a of the tracks 3 travel over rollers 6 which are positioned adjacent the end rollers or wheels 4 and which, like these, are mounted on axles 7 in the chassis. Between these two rollers 6, a plurality of holding-down and supporting rollers may be provided for the lower parts 3a of the tracks 3. If appropriate, supporting rollers for the upper track parts 3b may be provided in the area between the two end rollers or wheels 4 for the tracks.

The crawler vehicle shown in FIG. 1 can be moved over the ground 2 by a pulling or pushing action, for instance manually via a drawbar 8 but, if desired, the crawler vehicle may be equipped with one or more driving units for driving the tracks 3 by transmission of a driving force to, for example, the left and/or right hand end rollers or wheels 4, in which case the arrangement should be such that the two tracks 3 can be driven independently of one another, i.e. in such a manner that either track can be driven slower than the other one or stopped while the other is driven, for steering the crawler vehicle in a manner similar to that of conventional power-operated crawler vehicles.

The chassis shown in FIG. 1 comprises a lower frame having a number of parallel transverse beams 9 and an upper rectangular frame generally designated 10 and comprising a number of parallel transverse beams 11. The upper frame 10 and the beams 11 constitute a platform for carrying loads.

It should be noted, however, that the chassis may be of any desired construction, depending upon how large and powerful a machine one desires, and depending upon the type of the load to be handled. It should be mentioned in this connection that the machine could also be equipped and used for the transport of personnel.

The chassis 1 carries a number of air cushions 12, for example a single cushion 12 or an air cushion 12 at either end of the track or each track, as shown in FIG. 1. These air cushions 12 are adapted to support the major part of the weight and the load of the apparatus in relation to the ground 2, but are essentially independent of the character of the ground, in that the air cushions are adapted to act against the lower parts 3a of the tracks 3.

The air cushions may be conventional, commercially available air cushions. One such air cushion usually comprises a load-carrying plate which may be of circular shape, although it may also be, for example, oval or rectangular, and a membrane circumferentially affixed to the edge of said plate and usually consisting of a wear-resistant, for example reinforced rubber or plastic sheet, a connection for compressed air being provided in the load-carrying plate for injection of compressed air into a chamber between said plate and said membrane. When the chamber is filled with compressed air, the load-carrying plate is raised, simultaneously as the membrane is urged with an annular surface against the ground 2. By evacuating the compressed air from the chamber through valve-controlled apertures in the membrane or the so-called landing gear of the air cushion to the underside of the central portion of the membrane, and by sufficiently increasing the air pressure, the air is pressed radially outwards between the underside of the membrane and the ground 2 so that an air film is formed between the membrane and the ground.

Air cushions of this prior art type may be used for the crawler vehicle according to the present invention, but the air cushions are so arranged that their membranes upon supply of compressed air are first urged into engagement with the upper side of the lower track parts 3a of the track 3, whereupon the air cushions 12 raise the chassis in relation to the lower parts 3a of the track 3 which thus are urged against the ground 2. When the air pressure forces the air out between the underside of the membranes of the air cushions and the upper side of the lower parts 3a of the tracks 3, air films are formed between these track parts 3a and the air cushion membrane, If, as shown in the drawings, the air cushions 12 are disposed between and adjacent the rollers 6, the rollers 6 can be relieved to a substantial degree of the weight of the chassis 1 and the weight of the load, and the total load is instead transferred to the ground 2 via the lower parts 3a of the tracks, whereby the rollers 4 lying at a level above the ground 2 are subjected substantially to stretching force only. Because the weight of the chassis and the load is transferred to the ground 2 via the lower parts 3a of the tracks 3, the said parts will consequently be urged with considerable force against the ground, but since the track-laying principle is utilized for moving the vehicle and since the tracks do not exert any sliding friction against the ground 2 during movement of the vehicle, the resistance to movement is constituted substantially by the friction in the bearings of the rollers 4, 6 so that the vehicle can be moved with a relatively low expenditure of force. It should be noted that the lower track parts 3 in the area between the rollers 6 may be supported against the chassis 1 via air films from a larger number of air cushions than the air cushions 12 illustrated in the drawings which by means of their air or carrying plates are connected to chassis beams 9.

To counteract the tendency of the air cushion to press the chassis upwards by the air pressure, while raising the lower part 3a of the track 3 in a curve where it bridges the air cushion, the rollers 6 are adapted to stretch the track part 3a, and to this end the rollers 6 are slidable with respect to the chassis and preferably are adjustably loaded against the track part 3a by means of a loading device which in FIG. 1 is illustrated schematically in the form of pressure springs 15. However, instead of pressure springs, other means could be utilized, such as pressure fluid cylinders, for instance compressed air cylinders, and even mechanical jacks or equivalent means. It might also be advantageous if the rollers 6 are displaceable and loaded in the directon towards the wheels 4 or downwardly, and laterally towards said wheels.

The inner sides of the tracks 3 should be smooth over the width against which the air cushions 12 act, and by maintaining the lower track parts 3a stretched, the air cushions can operate under favourable conditions against smooth, planar surfaces. Dirt particles on the ground 2 will have no effect, and unevenness of the ground 2 can be tolerated up to the limit at which the tracks 3 do not sufficiently equalize or eliminate such unevenness in relation to the air cushions. If relatively thick and robust tracks 3 are used, they could eliminate also the effect of a relatively large unevenness of the ground, i.e. they could bridge such unevenness without non-permissible bending or buckling of the upper sides of the track parts 3a. The tracks 3 could be grooved on the outer side to impart to said outer side the form of vehicle tire treads. According to a preferred embodiment which will be described below, the wearing plates 5 of the tracks may be in the form of transverse rods which contribute to keep the ground-engaging track part planar and smooth and which improve the ability of the tracks to bridge uneven stretches of the ground. For light crawler vehicles which are moved by hand, the tracks should be supple, whereas stiffer tracks may be used for heavier vehicles designed for bigger loads. In power-driven vehicles, the engines can be used for operating compressors for the air cushions, and in vehicles where the air is supplied to the air cushions from a compressed air source outside the vehicle via hoses, the tracks may be operated by means of compressed air engines. Pressure medium operated engines may be in the form of radial piston engines incorporated with, for example, the wheels, but it is of course also possible to use internal combustion engines or electric motors for operating the tracks and for steering the vehicle by operating the tracks at different relative speeds.

Instead of using double, parallel tracks 3 a single wide track may be used for the crawler vehicle shown in FIG. 1, but it is of course also possible to use more than two tracks, and each track need not extend over the entire length of the vehicle since it is possible to use in the longitudinal direction of the vehicle several successive endless tracks with air cushions. It is also possible to use, for one and the same transport apparatus, several small crawler vehicles for a common load-carrying platform.

Also the number of air cushions for each track may vary. A crawler vehicle having a single relatively wide track requires, in principle, but one air cushion centered on a vertical axis through the point of gravity of the vehicle. In this case however, problems are encountered in properly balancing the vehicle, and these problems can be eliminated by using, for a single track, three air cushions for three-point support. When two tracks are used, as in the embodiment shown in FIG. 1, two air cushions for each track are preferred, but if the tracks are long, three or more air cushions may be used.

The spring-biased support rollers 6 adapted to hold down the track or tracks may be so arranged that they can be pulled up from a ground-supported position, but it is also conceivable to complete the rollers 6 with other supporting means, as will appear from the following.

FIGS. 2–4 show an embodiment of a crawler vehicle having a track 2 which consists of two parallel endless chains 20 between which extend rods 21 of suitable configuration, made of steel or other suitable material. These rods extend in parallel between and are supported by the chains 20 and form the ground-supported portions or surfaces of the tracks. The rods may be arranged either such that they form, along the straight, parallel track parts, a closed supporting plane which is impermeable to air or at least sufficiently air-impermeable for the described mode of operation of one or more air cushions (not shown) supported by the vehicle chassis 22. If desired, the track may comprise an air-tight sheet which forms a tight interior side around the entire track. In this embodiment, the wheels at the ends of the endless track are in the form of chain wheels 4' engaging the chains 20 of the track and forming guide wheels, the wheels at one end of the endless track loop also forming a set of driving wheels. Between the air cushion (not shown) and the respective wheels 4' there is provided a supporting wheel 6' which, like the wheels 4', may be in the form of a chain wheel. The wheels 6' serve to keep the track 3' stretched between the chain wheels 4 and are therefore supported on, for example, arms 23 which are pivotally mounted on the axles of wheels 4' and can be swung upwards and downwards by loading means, such as springs or cylinders 24 with a piston which can be biased by compressed air. If the track 2 shown in FIG. 2 is of considerable width and length, several compressed air cushions may be used, in which case suporting wheels 6' should be provided also beween the air cushions to keep the lower part of the track stretched, i.e. as planar and straight as possible. In other words, the supporting wheels 6' are intended to prevent outward deflection of the lower part of track 3' in the area of the air cushion or cushions.

By operating the track by means of chain wheels 4' and chains 20 and by holding down the track rods 21 in the manner described above, the tendency of the track to travel sideways during operation and the large air losses arising if the track forms a curve over each air cushion, are eliminated.

FIG. 2 shows a driving motor 25 for operating two chain wheels 4' at one end of the vehicle via a gear 26, and FIG. 4 shows a cut-away section of the track 2 on the left-hand side to illustrate a chain wheel.

Instead of chain wheels and chains, it is also possible to use V-belts or toothed belts and corresponding wheels having essentially the same mode of function to prevent sideways travel of the track.

The embodiment illustrated in FIGS. 5–8 distinguishes over the embodiment according to FIGS. 2–4 in that the platform 31 which, in this case, is of square configuration and has a relatively large surface, is supported at each of its corners by means of a vehicle 32 of the basic design shown in FIGS. 2–4. The chassis of the two vehicles 32 are connected, possibly pivotally, with the platform 31 which may have supporting frame beams 33 along the sides of the frame, and transverse diagonal frame beams 34 and 35, respectively. The four vehicles units 32 are provided each with one air cushion and each with one track 3, two guide wheels 4 of which at least one is adapted to be driven, and a supporting roller 6 between each guide wheel 4 and the air cushion. The two supporting rollers or wheels 6 are disposed in the manner described above for keeping the respective tracks 3 stretched and as planar as possible.

In the embodiment illustrated in FIGS. 5–7, the diagonal frame beams 34 carry two retractable supporting means in the form of bellows 36 connected to the compressed air system, and a similar bellows 36 is provided at one side of the vehicle at the centre of a frame side beam 37. Normally, these bellows are retracted, as shown in FIG. 5, but by supplying compressed air the bellows 36 can be filled to urge supporting plates 38 against the ground, as will appear from a comparison between FIGS. 6 and 7. The supporting action offered by these bellows 36 makes it possible to raise the entire platform 31, including the vehicles 32, from the ground on a three-point support. If each vehicle 32, as it is assumed to be, is rotatable about an axis 39 relative to the platform 31, the vehicles can readily be rotated in the raised position of the platform by means of a motor 40 via a chain 41 extending around chain wheels 42 on the vehicles. The platform can than be lowered so that it will again rest upon the vehicles 32. This arrangement makes it possible to rotate the equipment for changing the direction of travel in the manner illustrated in FIG. 8.

FIGS. 9-11 illustrate a further modified embodiment in which four bellows 36 are provided on a central plate 50. This arrangement makes it possible to raise and rotate the platform 31, said platform and said plate being provided with a guiding device consisting of a circular guide 51 which is supported by the plate 50 and guide means 52 mounted on the platform and engaging the guide 50. In this embodiment, the transport apparatus can be moved for instance in the manner illustrated in FIG. 11.

To facilitate transport of the apparatus according to all of the embodiments described above, the track or tracks bewteen the guide wheels or rollers 4 must be kept stretched over the respective air cushions by means of stretching supporting wheels 6 or 6' of the type described above, both to reduce the tendency of the tracks to travel sideways during movement of the lifting and transport apparatus and to prevent friction against lateral supports that must otherwise be employed in order to retain the tracks on the wheels and rollers.

It will be evident from the above that the arrangements herein disclosed contribute to realize the object of the invention which is to improve the lifting action of the air cushions by reducing air losses and to facilitate steering of the apparatus without undue strain upon the tracks, while simultaneously eliminating the tendency of the tracks to travel sideways on the wheels.

The arrangement for stretching the ground-engaging parts 3a of the tracks 3 is, for example, dependent upon the engagement between the tracks and the supporting wheels, and unless the tracks are kept stretched, but are allowed to sag over the air cushions, the tracks can travel sideways and disengage themselves from the supporting wheels, even if these are provided with teeth or grooves for the toothed belts, chains, V-belts or ribs on the tracks. Presumably, the most efficient stretching effect is obtained by subjecting the supporting wheels to loads in directions away from each other, but since the supporting wheels are to be carried also by the vehicle, the most practical solution would seem to be the application of a load obliquely downwardly and towards the chassis ends, for example in combination with the possibility of swinging movement.

The modified embodiments described above are intended to show that the invention is not restricted to a single specific embodiment, but may be modified in different ways within the scope of this invention.

What I claim and desire to secure by Letters Patents is:

1. A transport apparatus comprising at least one crawler vehicle having a chassis, at least one movable endless track having a ground-engaging part, a plurality of wheels which are supported by the chassis and over which the track travels, said wheels comprising a track guide wheel at either end of the chassis, air cushion-producing means supported by the chassis and disposed between the chassis and the lower ground-engaging track part, and a source of compressed air for supplying air to the air cushion-producing means in order to provide between the chassis and the ground-engaging track part an air film supporting the chassis relative to the ground via the ground engaging engaging track part, wherein the chassis, in the area between the guide wheels adjacent either end of the chassis, supports moveable track hold-down and tensioning wheels which engage the upper side of the ground-engaging part of the endless track, said track hold-down and tensioning wheels being mounted movably along a substantially vertical axis relative to the chassis, said air cushion-producing means being disposed in the area between said track hold-down and tensioning wheels; a biasing device for biasing said track hold-down and tensioning wheels in a downward direction, said track hold-down and tensioning wheel biased by said biasing device to stretch and straighten the track along the portion thereof acted upon by the air cushion and thus act against the tendency of said air cushion to bend said track portion downwardly when it raises and supports the chassis in relation to the ground.

* * * * *